INVENTOR.
KAZUO KIYONAGA
BY
ATTORNEY

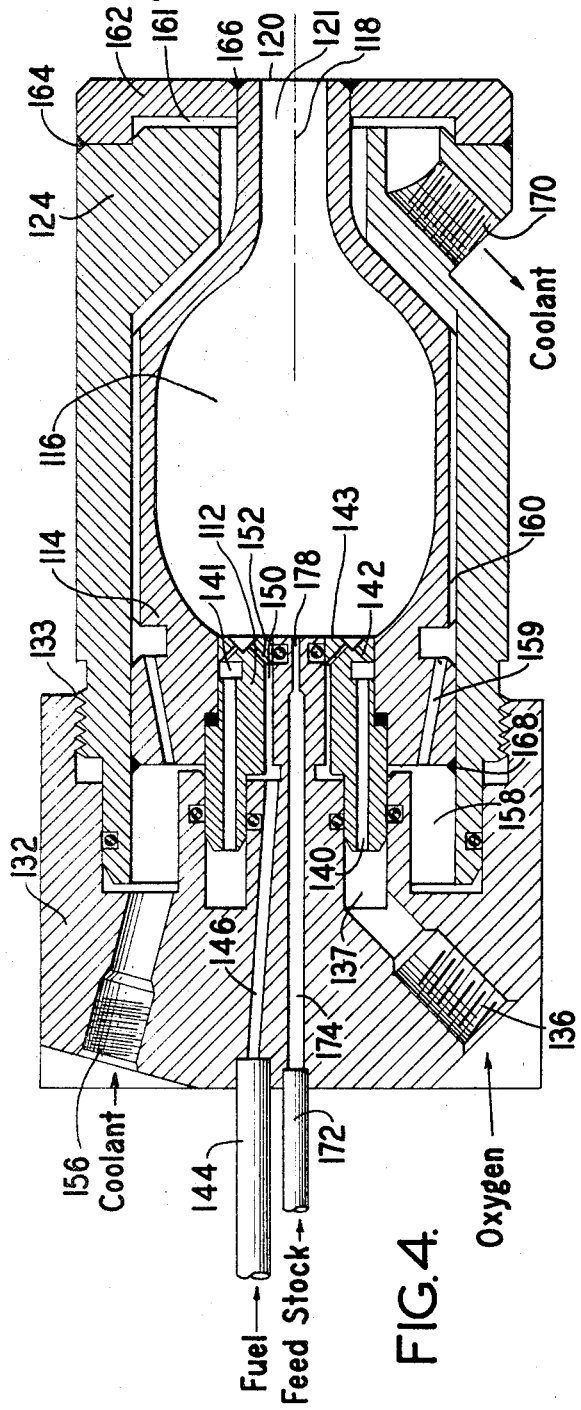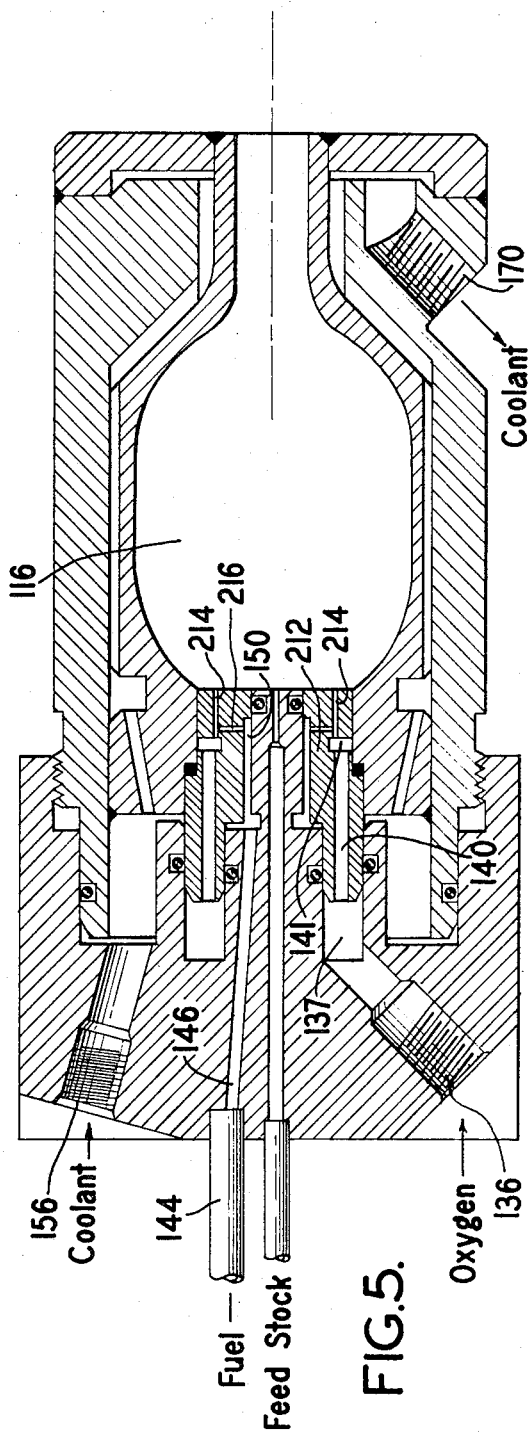

United States Patent Office 3,565,586
Patented Feb. 23, 1971

3,565,586
APPARATUS FOR PRODUCING CARBON BLACK
Kazuo Kiyonaga, Newark, N.J., assignor to Union Carbide Corporation, a corporation of New York
Continuation-in-part of application Ser. No. 543,878, Apr. 20, 1966. This application Apr. 10, 1967, Ser. No. 629,601
Int. Cl. C09c 1/48, 1/52; C10b 47/04
U.S. Cl. 23—259.5       7 Claims

ABSTRACT OF THE DISCLOSURE

A burner suitable for the manufacture of carbon black comprises an internal combustion chamber communicating axially at its discharge end with a processing chamber. The burner operates by having fluid hydrocarbon stock injected axially as a continuous coherent stream from the inlet end of the combustion chamber through such chamber and into the processing chamber where a constricted, high velocity stream of hot combustion products disperse, shear and pyrolyze the hydrocarbon feed stock to form carbon black. Use of a water-cooled, heat conductive metal body which forms the walls of both the combustion and processing chambers permits use of very high operating temperatures.

BACKGROUND OF THE INVENTION

This invention is a continuation-in-part of application Ser. No. 543,878 filed on Apr. 20, 1966, now abandoned.

The present invention relates to apparatus for making carbon black, and more particularly to an internal combustion burner capable of producing carbon black of preselected particle size and quality.

Four general types of carbon black are recognized in the art; these are lamp black, channel black, furnace black and thermal black. The primary classifications are based on the method by which the carbon black is made, and further sub-classification is based on the use for which the black is intended. The uses for carbon black are varied and numerous, although over 90% of the carbon black produced is consumed by the rubber industry, principally in the manufacture of tires. The remainder of the production is used as filler or pigment in the manufacture of printing ink, paint, paper and plastics.

All carbon blacks possess many similar properties regardless of their method of manufacture or the raw materials from which they are made. They all consist of from 90–99% elemental carbon, with the remainder consisting of varoius amounts of oxygen, hydrogen and volatile hydrocarbons, depending upon the type of black and its method of manufacture. Thus, the distinctions between the various types and grades of carbon black are ones of degree. These distinctions are based on such properties as average particle size, particle size distribution, surface area, chemical composition of the surface, and the extent of particle to particle association referred to as "chain structure" or simply "structure."

All methods of making carbon black consist of converting hydrocarbons to elemental carbon. Lamp black is made by partially burning petroleum or coal tar residues in shallow pans; channel black by impinging a natural gas flame on steel channels, and furnace black by combusting one part and thermally decomposing the other part of gaseous or liquid hydrocarbon feed stock in specially designed furnace. Thermal black is likewise produced in a furnace; however, reactor heat for decomposition of the hydrocarbon feed is supplied indirectly, and essentially no oxygen is present in the pyrolysis reaction.

In order to have the best properties for most of its uses, and particularly for use in tires, carbon black must be of very fine particle size. Channel black is normally considered the highest quality black, having average particle diameters of about 90–290 A. and surface areas of about 100–1000 m.$^2$/g. Unfortunately, however, the channel process is a very inefficient one, and results in average yields, according to the U.S. Bureau of Mines Minerals Yearbook (1964), of 2.2 lbs. per 1000 cubic feet of natural gas. By way of comparison the furnace process results in average yields of 4.6 pounds per gallon of oil, which is a substantially higher yield than that obtained by the channel process based on the carbon content of the feed. Most carbon black today is therefore made by one of the numerous varieites of the furnace process. Furnace blacks, however, are generally much coarser than channel blacks, having average particle diameters of about 180–550 A. and surface areas of about 25–200 m.$^2$/g. Those furnace blacks which approach the quality of channel blacks are usually obtained only at a considerable sacrifice in yield.

Although precise knowledge of the mechanism of decomposition is lacking, it is generally accepted in the art taht initial decomposition occurs by cracking and dehydrogenation to form active fragments which then combine to form nuclei. These may then either be destroyed by oxidation or continue to grow and emerge as solid carbon particles. The greater the number of nuclei created the smaller the size of the carbon black produced. Accordingly, high temperatures and rapid heat transfer for the speedy production of nuclei, short growth time, and uniform conditions during growth are necessary for the efficient production of fine particle sized carbon black having a narrow particle size distribution.

Although most furnace processes employ air to provide the oxygen necessary for combustion of the hydrocarbon fuel, the use of oxygen gas in place of air has also been proposed, for example, by Williams in U.S. Pat. No. 2,623,811. Williams, however, found it necessary to dilute the oxygen with four or more volumes, per volume of oxygen, of what he calls "heat-absorbing" gases, specifically $CO_2$, $CO$, $H_2$ or water vapor, in order to lower the temperature of the combustion reaction and prevent melting and rapid wear of the refractory lining of the furnace. Williams restricts the use of oxygen to an amount which will form combustion gases having a temperature of up to 3500° F. Since Williams' oxidizing gas ends up containing 20 percent or less oxygen, what he has done, in effect, is to replace the nitrogen which would be in the air with one of the aforementioned "heat-absorbing" gases.

The construction of burners with refractory material, as shown in the Williams patent, represents conventional burner design. However, as noted above, the use of such construction limits the operating temperatures of the burner.

OBJECTS

It is an object of the present invention of provide apparatus capable of producing carbon black of channel grade quality by a furnace type process that is simpler and more efficient than any heretofore available, and yet avoids the difficulties and disadvantages of the channel type process. It is another object of this invention to provide an apparatus capable of being adjusted to produce carbon black of either channel or furnace quality without coking. It is yet another object of this invention to provide an apparatus that is capable of producing carbon black having a finer particle size than is normally obtained with a furnace type process or a conventional channel type process, and having a highly desirable combination of properties, i.e. particle size distribution, surface area, chemical composition of the surface and chain structure. It is a further object of this invention to provide a burner which produces carbon black at high temperatures and permits rapid heat transfer from the combusted gases to the hydrocarbon feed stock to be thermally decomposed.

SUMMARY OF THE INVENTION

These and other objects, which will become apparent from the detailed disclosure and claims to follow, are achieved by the present invention which provides in an apparatus suitable for the manufacture of carbon black comprising a combustion chamber having an inlet end and communicating axially at its discharge end with a tubular processing chamber having a smaller cross-sectional area than said combustion chamber, and means for supplying an oxidant gas and fluid fuel to the inlet end of said combustion chamber wherein the fuel and oxidant react chemically to produce a flame, the resulting hot products of which flow through said processing chamber, the improvement comprising:

(1) Rendering said apparatus capable of sustained operation at flame temperatures up to about 6000° F. by having the walls of said combustion and processing chambers constructed of heat conductive metal and provided with cooling means for said walls, and (2) Providing means for directing at least one stream of fluid feed stock from the inlet end of said combustion chamber toward the axial center of the processing chamber in such manner that said stream of feed stock passes through the combustion chamber as a continuous, coherent stream until it reaches the processing chamber where it is sheared, dispersed, and pyrolized by the hot, constricted, turbulent, high velocity combustion gases.

THE DRAWINGS

In the accompanying drawings:

FIG. 4 is a longitudinal cross-sectional view of apparatus according to a preferred embodiment of the invention showing a head suitable for use with natural gas as the fuel;

FIG. 5 shows a head interchangeable with the head of FIG. 4 and suitable for use with oil as the fuel;

DESCRIPTION

Figure 1:
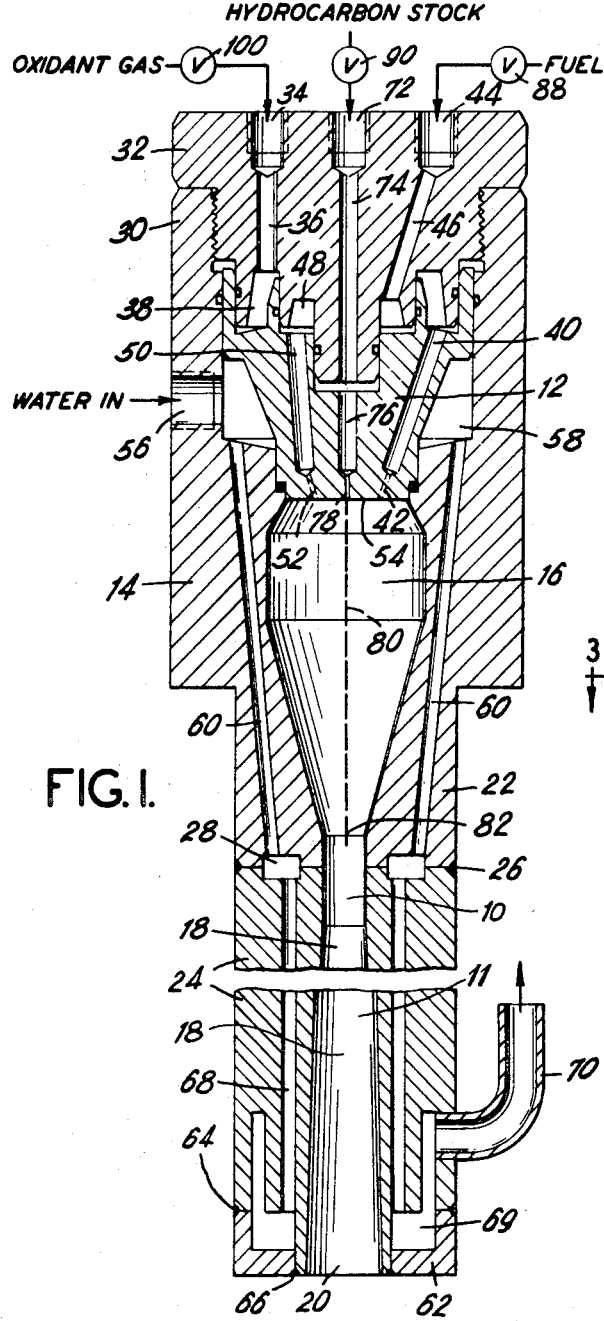
FIG. 1 is a longitudinal cross-sectional view of an internal combustion type burner, illustrative of the invention.
Figure 2:
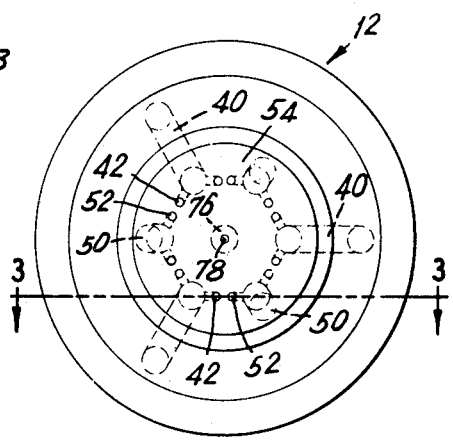
FIG. 2 is a view in front elevation of the head member used in the burner of FIG. 1.
Figure 3:
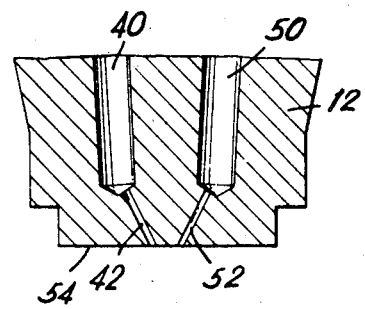
FIG. 3 is a fragmentary view in section taken on line 3—3 of FIG. 2.

Referring to FIGS. 1–3, the burner shown comprises a head member 12 and a body member 14. The body 14 is provided with two chambers, a combustion chamber 16, and a processing chamber 18. The combustion chamber 16 is generally conical in shape. It tapers down and communicates with the cylindrical section 10 of the processing chamber 18 which also includes a slightly expanding conically shaped section 11 with the wider portion of the cone located at the discharge end 20 of the burner. The burner body 14 is made of a front section 22 and a back section 24 welded together at 26 with an annular water distributing chamber 28 formed therebetween through which water or other suitable coolant is circulated to prevent the burner from overheating. The discharge end of the burner is provided with cap 62 which is circumferentially welded at 64 and 66 to the front section 24 of body 14.

Head 12 is held in place within the inlet end 30 of body 14 by a rear end housing 32 which is threadably attached to body 14. Rear end housing 32 is provided with an inlet port 34 through which oxidant gas, preferably oxygen, is introduced to head 12 by means of passage 36 and an annular distribution channel 38. The oxidant gas flows from channel 38 through a plurality of inclined passages 40 located in head 12, and then through a plurality of discharge ports 42 opening into combustion chamber 16. Housing 32 also contains a fuel inlet port 44 which communicates through an inclined passage 46 and an annular distribution channel 48 with a plurality of passages 50, located in head 12, and ending in ports 52 which open into chamber 16. Ports 42 and 52 are located at selected angles from the central longitudinal axis of head 12 so that the emerging streams of fuel and oxidant intersect in the combustion chamber 16 a short distance downstream of the tip 54 of head 12 in order to provide good mixing.

In order to provide fluid-tight seals between the body 14, head 12 and housing 32, O-ring gaskets are located, as shown, in annular grooves provided therefor.

Body 14 is also provided with a water inlet port 56 which communicates through annular distribution channel 58 and inclined passages 60 with annular chamber 28. The cooling water is discharged from chamber 28 through a plurality of passages 68 extending through the front section 24 of body 14 into an annular chamber 69 and thence out through conduit 70. The walls of the combustion chamber 16 and the processing chamber 18 are preferably copper and water-cooled as indicated. Thus, the need for using refractory materials is eliminated.

Rear end housing 32 is also provided with a central feed stock inlet port 72 which leads through central passage 74 and corresponding central passage 76 in head 12 to exit port 78. The hydrocarbon feed stock oil is discharged from port 78 as a coherent or solid stream, as indicated by dotted line 80, through combustion chamber 16, and into the axial center of the inlet end 82 of the processing chamber 18 which constitutes, in the present embodiment, a constricting throat for increasing the velocity of the hot products of combustion leaving combustion chamber 16. If desirable, instead of the single port 78 shown, a plurality of individual ports (not shown) may be annularly disposed around the longitudinal axis of the burner and directed towards the axial center of the processing chamber. The axial center of the processing chamber is defined as a zone extending parallel to and adjacent with the axis of said chamber and extending the length of said chamber.

The supplies of fuel, hydrocarbon stock, and oxidant gas are controlled by adjustable valves 88, 90 and 100, respectively, whereby such supplies can be adjusted to control the quantity and quality of the product.

Oxygen and fuel are supplied to the internal combustion chamber 16 wherein they react chemically. The resulting products of combustion flow in a continuous stream towards the inlet end or throat 82 at an average velocity of at least 1000 ft./sec. Since the cross-sectional area of the throat 82 is substantially less than that of the combustion chamber 16, the stream of combusted gases flow through the throat 82 with substantial turbulence and at a velocity considerably above 1000 ft./sec., in fact, at a velocity approaching the sonic range. The hydrocarbon oil feed stock 80 is injected axially down the center of the burner into the stream of hot, high velocity combusted gases, in such manner as to keep the oil in a solid stream until it reaches the center of the inlet end 82 of the processing chamber 18, where the hydrocarbon stock 80 is rapidly sheared, dispersed, and pyrolized in the highly turbulent stream of hot combustion products. Axial injection of the hydrocarbon stock according to the present invention produces no undesirable coke deposits on the walls of the combustion and processing chambers.

Although pure oxygen is preferred as the oxidant for combusting the fuel, oxygen enriched air containing at least 50 percent oxygen by volume may also be used. The amount of oxygen used to combust the fuel should be approximately the stoichiometric amount required to complete combustion of the fuel results in a higher flame completely combust all of the fuel to $CO_2$ and water, since temperature than incomplete combustion to CO. By completely combusting the fuel, temperatures of about 4000–6000° F. can be obtained in the combustion chamber 16 of the burner. This high temperature is critical to the achievement of the desired results, since it is responsible for the rapid and uniform thermal decomposition of the hydrocarbon feed material to carbon black. Due to the endothermic nature of the reaction the final temperature at the outlet end 20 of the processing chamber 18 is about 2500–3500° F. This lower discharge temperature makes it possible to discharge the mixture of carbon black and other combusted matter from the burner into a conventional refractory lined, reaction chamber (not shown) wherein further reaction may take place, and the hot mixture of carbon black and gases are quenched with water and passed into a carbon black collector unit. The reaction time of the mixture in the reaction chamber is controlled by adjusting a water-spray nozzle according to conventional practice in the art. Such adjustment, in conjunction with that of supply valves 88, 90 and 100 is used to control the resulting particle size and quality of the product.

The carbon black produced by the apparatus of this invention is characterized by having the following properties: an average particle diameter of about 50 to 550 A., preferably 100 to 500 A., a surface area of about 20 to 1000 m.$^2$/g., an oil absorption of about 0.8 to 5.0 cm.$^3$/g., and nigrometer values of 50 to 100. In addition, yields as high as 47% based on the carbon content of the feed material have been obtained in the production of channel black quality carbon black.

FIGS. 4 and 5 illustrate a preferred embodiment of the carbon black burner of this invention, which reduces heat losses and eliminates undesirable coke deposition in the burner. In this embodiment, the portion of the processing chamber which was previously located downstream of the constricted throat has been eliminated. This reduces heat losses from water cooling and completely eliminates the possibility of coking in this part of the burner. The general shape of the burner body 114 which contains combustion chamber 116 is oval, thereby decreasing surface area per unit volume, and consequently, heat losses. Rear end housing 132 can accommodate heads which are readily interchangeable for use with either natural gas as the combustion fuel, as illustrated by head 112 shown in FIG. 4, or for use with oil as the primary combustion fuel, as illustrated by head 212 shown in FIG. 5.

Referring to FIG. 4, the burner is provided at its discharge end with an annular cap 162 which is circumferentially welded to both the burner body 114 at 166 and to a burner housing 124 at 164. The burner housing 124 is threadably attached to the rear end housing 132 and 133, and surrounds the burner body 114 to which it is circumferentially welded at 168. Housing 124 and body 114 may be made of a heat conductive metal. A water coolant is introduced through inlet port 156 which communicates by way of annular distribution channel 158 and inclined passages 159 with a plurality of cooling water passages 160 formed between housing 124 and burner body 114. The coolant flows out of passages 160 into annular passage 161 and then out of the burner through discharge port 170. Oxidant gas is introduced at inlet port 136 and flows into annnular chamber 137 and then through a plurality of passages 140 and annular passage 141 in head 112 emerging into combustion chamber 116 through a plurality of discharge orifice passages 142. Fuel gas is introduced from a supply conduit 144 into a passage 146 located in the rear end housing 132 which communicates with annular passage 150 formed by the outer surface of housing 132 and the inner surface of head 112. From passage 150 the fuel gas flows into the combustion chamber 116 through a plurality of discharge orifice passages 152. Passages 142 and 152 are located at 45° angles from the longitudinal axis of the burner so that the emerging streams of the fuel and oxidant intersect in the combustion chamber a short distance downstream of the end face 143 of head 112. The hydrocarbon stock is injected into the burner via a supply conduit 172 communicating with central passage 174 located in rear end housing 132 and terminating in axially directed discharge orifice passage 178. The hydrocarbon feed stock is directed out of passage 178 towards the center 118 of the throat 121 where it is rapidly sheared, dispersed and pyrolized in the highly turbulent stream of hot combustion gases. The combustion gases and the finely dispersed hydrocarbon mixture emerge from the end 120 of the throat 121 and are discharged into a conventional refractory lined reaction chamber.

Figure 6:
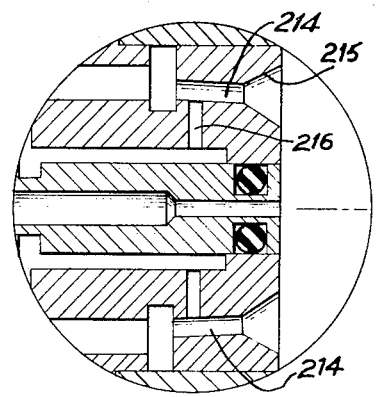
FIG. 6 shows an enlarged fragmentary view of the discharge end of the head of FIG. 5, illustrative of a preferred head suitable for use with oil as the fuel.

Heretofore, attempts to substitute oil for gas as the combustion fuel have resulted in excessive coking in the burner. This problem has been eliminated by the embodiment of the present invention shown in FIG. 5. In FIG. 5, the head 212 differs from the head 112 of FIG. 4 in that the fuel is premixed with the oxidant prior to being discharged into the combustion chamber 116. Oil flows in through passages 144, 146 and 150 into a plurality of laterally directed oil passages 216, each of which communicates at one end with a corresponding one of a plurality of generally longitudinally directed oxygen passages 214. In a preferred head shown in FIG. 6, the passage 214 may be directed parallel to the longitudinal axis of the burner, or may be inclined slightly up to about 15 degrees, towards such axis. Also, the passage 214 may be flared outwardly at its discharge end 215 leading into the combustion chamber. An oxidant gas flows through each of the passages 214 at sufficiently high velocity to atomize the combustion fuel oil as it emerges from the passages 216 into the oxidant gas stream. This results in the discharge of a fine oxy-oil spray from the outlet end of passage 214 into the chamber 116.

What is claimed is:

1. Apparatus capable of producing channel grade quality carbon black and capable of sustained operation at flame temperatures of up to 6000° F. comprising in combination:
    (A) a combustion chamber having an inlet end and a discharge end which communicates in axial alignment with,
    (B) a processing chamber having a cross-sectional area sufficiently smaller than the cross-sectional area of said combustion chamber to cause the combustion gases to attain an average velocity of at least 1000 feet per second in the processing chamber.
    (C) means for applying an oxidant gas and fluid fuel at the inlet end of said combustion chamber in the direction of the longitudinal axis of said chamber, whereby the fuel and oxidant are caused to combust and the resulting hot combustion gases are caused to flow through said processing chamber and become constricted therein by the smaller cross-sectional area of said processing chamber,
    (D) the walls of said combustion and processing chambers being constructed of heat conducting metal and provided with cooling means for said walls, and wherein the walls of said chambers communicate in a smooth, gradually tapered, obstruction-free manner, and
    (E) means for directing at least one stream of fluid feedstock from the inlet end of said combustion chamber towards and in the direction of the longitudinal axis of the processing chamber in such manner as to maintain said feedstock stream passing through the combustion chamber as a continuous coherent stream, until it reaches the processing chamber where it is sheared, dispersed and pyrolized by the hot, high-velocity combustion gases.

2. The apparatus of claim 1 wherein the fuel and oxidant are mixed in the combustion chamber by having the means for supplying the oxidant gas and the fluid fuel comprise separate passages for the oxidant and the fuel each of which communicates at its discharge end with the combustion chamber.

3. The apparatus of claim 1 wherein the means for providing fluid feed stock from the inlet end of said combustion chamber comprise a single passage disposed along the axis of the apparatus.

4. The apparatus of claim 1 wherein the means for providing fluid feed stock from the inlet end of said combustion chamber comprises a plurality of individual passages.

5. The apparatus of claim 1 wherein the means for supplying the oxidant gas and the fluid fuel to the combustion chamber comprise a plurality of fuel passages each of which communicates with a corresponding oxidant gas passage whereby the fuel and oxidant are mixed prior to entry into the combustion chamber.

6. The apparatus of claim 5 characterized further in that the passage means for supplying the premixed mixture of oxidant gas and fluid fuel to the combustion chamber are inclined to discharge toward the axis of the apparatus and are flared at the ends thereof opening into the combustion chamber.

7. The apparatus as claimed in claim 5 characterized further in that the passage means for supplying the premixed mixture of oxidant gas and fluid fuel to the combustion chamber are substantially parallel to the axis of the apparatus.

References Cited

UNITED STATES PATENTS

| | | | |
|---|---|---|---|
| 2,375,798 | 5/1945 | Krejci | 23—259.5X |
| 2,641,534 | 6/1953 | Krejci | 23—209.4 |
| 2,769,692 | 11/1956 | Heller | 23—259.5X |
| 2,934,410 | 5/1960 | Smith | 23—277 |
| 2,945,074 | 7/1960 | Elliott et al. | 260—679 |
| 3,003,854 | 10/1961 | Heller | 23—259.5X |
| 3,340,010 | 9/1967 | Selfridge | 23—259.5X |

FOREIGN PATENTS

| | | | |
|---|---|---|---|
| 833,411 | 4/1960 | Great Britain | 23—259.5 |

JOSEPH SCOVRONEK, Primary Examiner

D. G. CONLIN, Assistant Examiner

U.S. Cl. X.R.

23—209.4, 209.6, 209.8, 277

UNITED STATES PATENT OFFICE
CERTIFICATE OF CORRECTION

Patent No. 3,565,586　　　　　　　　Dated　February 23, 1971

Inventor(s)　Kazuo Kiyonaga

It is certified that error appears in the above-identified patent and that said Letters Patent are hereby corrected as shown below:

Column 1, line 67, "furnace" should read -- furnaces --
Column 2, line 14, "varieities" should read -- varieties --;
line 22, "taht" should read -- that --. Column 4, lines 74 and 75, "complete combustion of the fuel results in a higher flame completely combust all of the fuel to $CO_2$ and water, since" should read -- completely combust all of the fuel to $CO_2$ and water, since complete combustion of the fuel results in a higher flame --. Column 6, line 47, "applying" should read -- supplying --.

Signed and sealed this 20th day of July 1971.

(SEAL)
Attest:

EDWARD M. FLETCHER, JR.　　　　　　　WILLIAM E. SCHUYLER, JR.
Attesting Officer　　　　　　　　　　Commissioner of Patents